United States Patent
Denning et al.

(10) Patent No.: US 7,523,183 B2
(45) Date of Patent: Apr. 21, 2009

(54) LOCATOR FOR COMPUTER EQUIPMENT

(75) Inventors: Donald E. Denning, Tucson, AZ (US);
Robert G. Emberty, Tucson, AZ (US);
Tina L. Hernandez, Benson, AZ (US);
Craig A. Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 10/337,561

(22) Filed: Jan. 7, 2003

(65) Prior Publication Data

US 2004/0133662 A1   Jul. 8, 2004

(51) Int. Cl.
*G06F 15/173* (2006.01)
*G06F 15/177* (2006.01)

(52) U.S. Cl. ...................... 709/223; 709/220

(58) Field of Classification Search ................. 709/220, 709/223
See application file for complete search history.

(56) References Cited

U.S. PATENT DOCUMENTS

| | | | |
|---|---|---|---|
| 4,100,533 | A | 7/1978 | Napolitano et al. |
| 4,507,777 | A | 3/1985 | Tucker et al. |
| 5,423,026 | A | 6/1995 | Cook et al. |
| 5,485,464 | A | 1/1996 | Strodtbeck et al. |
| 6,023,724 | A | 2/2000 | Bhatia et al. |
| 6,134,682 | A | 10/2000 | Oakland |
| 6,246,872 | B1 | 6/2001 | Lee et al. |
| 6,377,987 | B1 * | 4/2002 | Kracht ........................ 709/220 |
| 6,798,766 | B1 * | 9/2004 | Bevan et al. ................. 370/352 |
| 6,915,339 | B2 * | 7/2005 | Hartman et al. ............. 709/220 |
| 2002/0065904 | A1 * | 5/2002 | Hartman et al. ............. 709/220 |
| 2004/0128373 | A1 * | 7/2004 | Schuster ..................... 709/223 |

OTHER PUBLICATIONS

"The Delphion Integrated View" www.delphion.com pp. 1 to 5.

* cited by examiner

*Primary Examiner*—John Follansbee
*Assistant Examiner*—Alan S Chou
(74) *Attorney, Agent, or Firm*—Scully, Scott, Murphy & Presser, P.C.; Robert Sullivan, Esq.

(57) ABSTRACT

A method and apparatus for locating an un-located asset in a computer center including a plurality of assets connected together by a network. The method comprises the steps of host asset of the computer center, obtaining an address for the un-located asset; and sending a command from the host asset to the un-located asset, through the computer center network, for the un-located asset to produce a signal for physically locating the un-located asset. Preferably, the method further comprises the steps of sending a request from the host asset to the un-located asset, through the computer center network, for the un-located asset to confirm that the un-located asset is in the computer center; and in response to receipt of said request, the un-located asset sending a signal to the host asset to confirm that the un-located asset is in the computer center. For example, an IP "SQUAWK" command may be issued from any computer asset or system in the computer center or network to the IP address of the un-located computer asset system. Preferably, the code needed to implement the SQUAWK command is contained in a patch that is loaded on the computer systems during initial system code load.

9 Claims, 3 Drawing Sheets

Search System

Unlocated System

LOCATOR FOR COMPUTER EQUIPMENT

BACKGROUND OF THE INVENTION

1. Field of the Invention

This invention generally relates to computer processing centers; and more specifically, the invention relates to methods and apparatus for physically locating individual computer systems in a processing center.

2. Background Art

Many data processing centers or computer networks have a large number of individual computer or computer systems dispersed over a large area. For example, even a small center may have as many as forty or fifty computers spread out over a large office or office building. At times, it may be necessary to locate physically particular computers in such a center or network, for example, to add, test or replace equipment. Physically locating a particular system in a large data processing center can become both time consuming and expensive due to the large number of systems present and the large area over which the computers are located.

SUMMARY OF THE INVENTION

An object of this invention is to provide a method and system to locate physically individual computers in a data processing center.

Another object of the present invention is to enable a person to sit at a computer terminal, in a data processing center, and to issue a command to locate any other computer in the center.

A further object of the invention is to provide procedures for computers in a data processing center that enable the computers to issue, and to monitor for, commands to locate the computers.

These and other objectives are attained with a method and apparatus for locating an un-located asset in a computer center including a plurality of assets connected together by a network. The method comprises the steps of a host asset of the computer center, obtaining an address for the un-located asset; and sending a command from the host asset to the un-located asset, through the computer center network, for the un-located asset to produce a signal for physically locating the un-located asset. Preferably, the method further comprises the steps of sending a request from the host asset to the un-located asset, through the computer center network, for the un-located asset to confirm that the un-located asset is in the computer center; and in response to receipt of said request, the un-located asset sending a signal to the host asset to confirm that the un-located asset is in the computer center.

More specifically, in the preferred implementation of the invention, an IP "SQUAWK" command is issued from any computer asset or system in the computer center or network to the IP address of the un-located computer asset system. Preferably, the code needed to implement the SQUAWK command is contained in a patch that is loaded on the computer systems during initial system code load. This patch runs as a daemon in the background of all the systems in the data processing center. Also, preferably, the code for this command is written in a high level, language, such as JAVA, to eliminate the need for porting the code to different host manufacture types.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
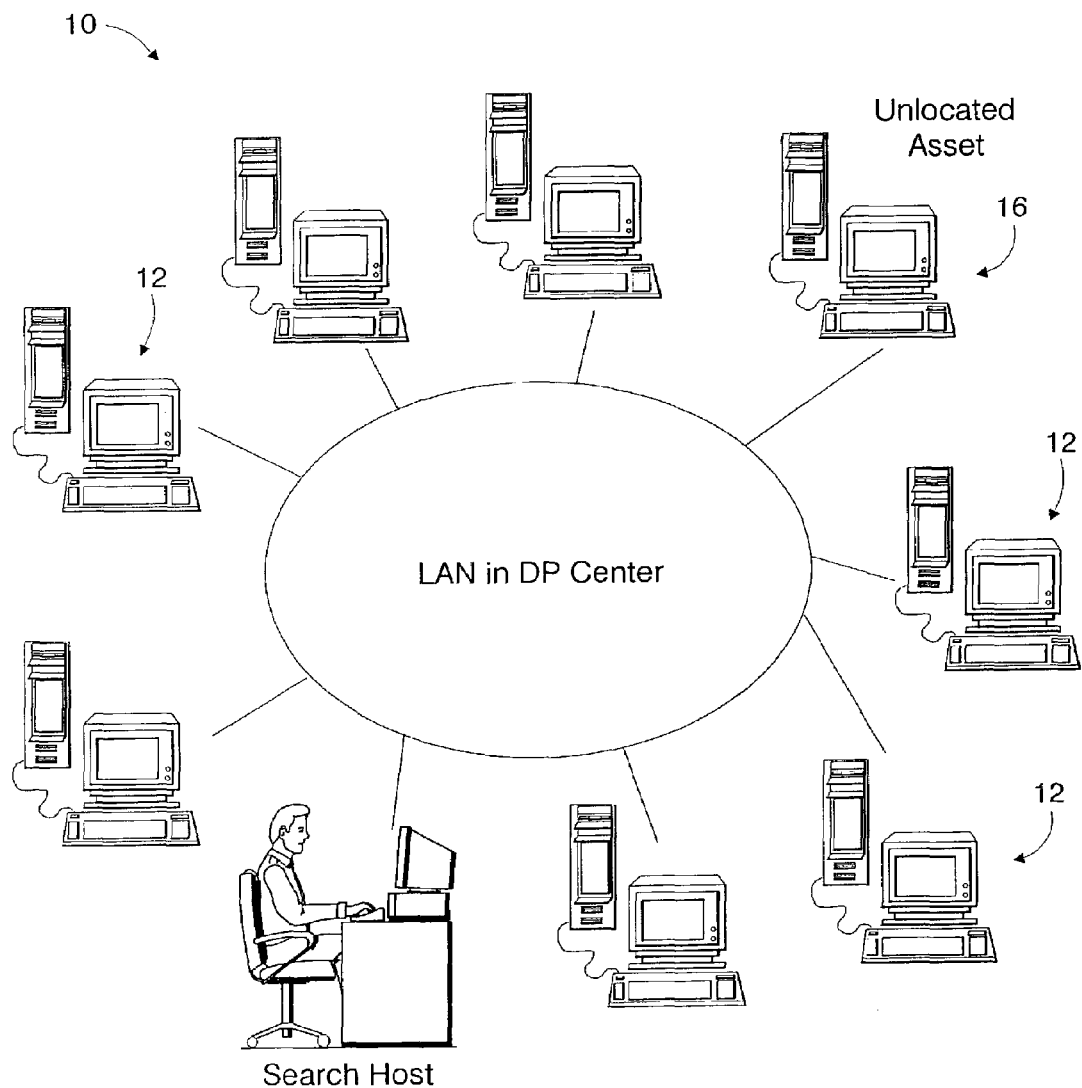
FIG. 1 shows a data processing center with which the present invention may be used.

FIG. 1 shows a data processing center 10 comprising a multitude of computer systems 12 connected together to form a local area network (LAN) 14. Any suitable computer systems may be used in center 10; and for example, as represented in FIG. 1, each system may include a central processing unit, a monitor, and input means such as a keyboard and a mouse. Other specific types of computers or computer systems may be used, however, and, for example, conventional personal computers, laptop computers, and work stations may be used. Also, the computer systems 12 may be connected together in any appropriate way to form LAN. Many suitable techniques for doing this are well known in the art.

It is not uncommon, in today's world, for the individual computer systems of a data processing center to be dispersed over a significant area, such a large office or an office building. Moreover, because of the mobile nature of many state of the art computers, the actual physical locations of specific computers of center may change from time to time. Because of these factors and others, a network administrator, or other individuals, may not know the exact location of particular computers in center. Such a computer is referred to as an un-located asset or un-located computer. For example, computer system referenced at 16 in FIG. 1 is considered to be un-located. In accordance with the present invention, at least one, and preferably all, of the computer systems of center 10 are provided with a procedure to locate an un-located asset in the center. Generally, this is done by an IP "SQUAWK" command issued from any computer system in the network to the IP address of the un-located computer system. Preferably, the code needed to implement the SQUAWK command is contained in a patch that is loaded on the computer systems during initial system code load. This patch runs as a daemon in the background of all the systems in the data processing center 10. Also, preferably, the code for this command is written in a high level, language, such as JAVA, to eliminate the need for porting the code to different host manufacture types.

For example, if one wanted to locate the host at IP address 9.115.63.69, an operator would issue a SQUAWK 9.115.63.69 command from any other computer in the network. The command is translated into an IP packet containing the command code and the address of the system to be located. This packet is then broadcast to all hosts and the IP address compared at each host; and when a match is found at the un-located host, that un-located host will, for example, begin beeping its speaker, thus allowing the un-located system to be easily found. Alternately, as another example, a blinking light could be used to identify the location of the un-located host.

Figure 2:
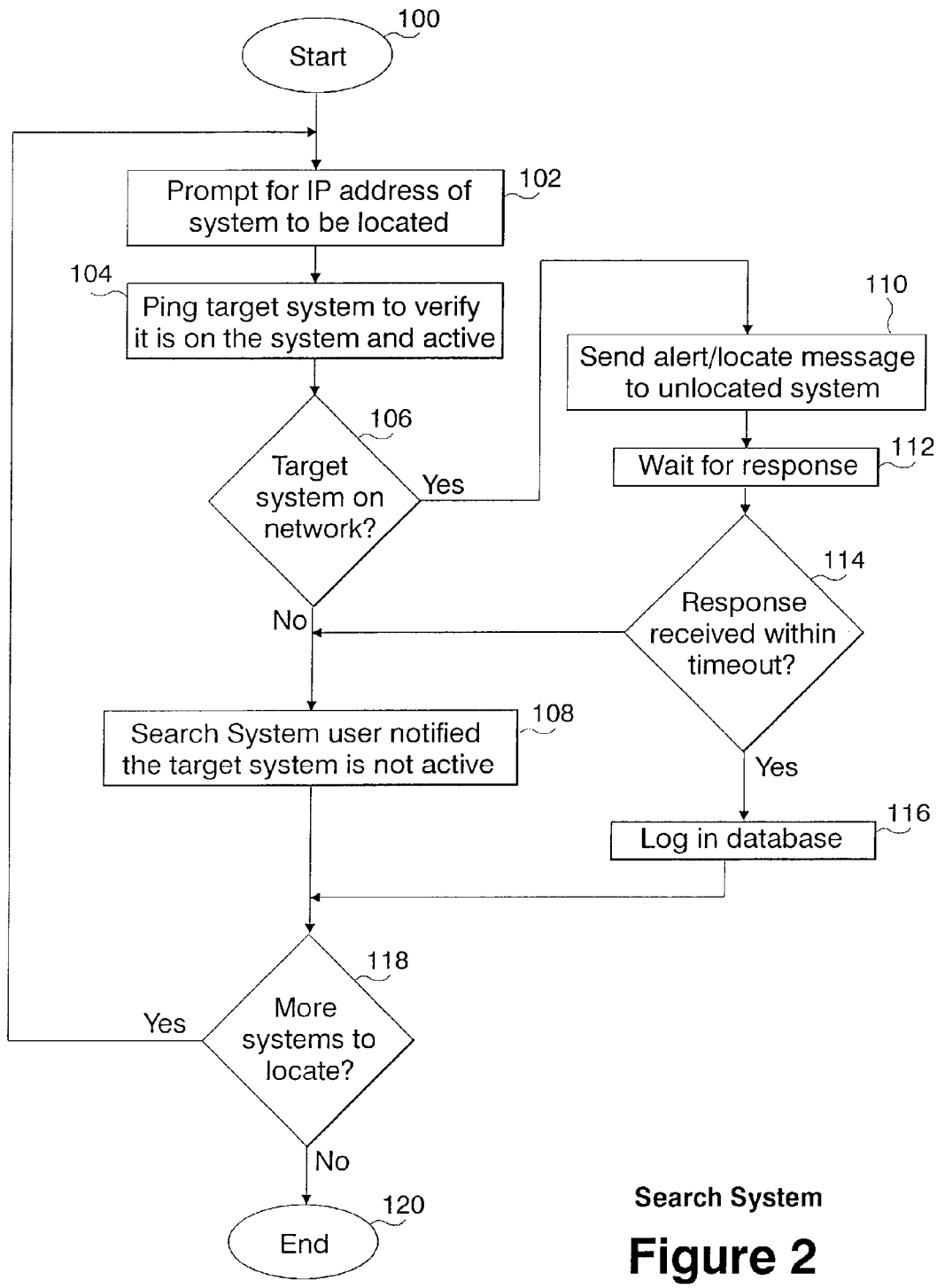
FIG. 2 is a flow chart illustrating a procedure employed by a searching computer of the data processing center to locate another computer in the center.

FIG. 2 is flowchart of a preferred procedure that may be used by any computer of center 10 to locate another computer of the center. At step 100 the procedure is started; and at step 102 the searching computer issues a prompt asking for the address of the un-located computer. For example, this prompt may be in the form of a message or dialog box shown on the computer monitor; and, in response, the user supplies the address of the un-located computer. After the searching computer is given this address, the searching computer, at step 104, sends a message to the un-located system asking that system to confirm that it is in the data processing center 10. This may be done, for instance, by a well known procedure referred to as a ping command.

At step 106, the searching computer determines, on the basis of the response to the message sent at step 104, whether the un-located system is on the data processing center 10. If the searching computer determines that the un-located computer is not in the center, the procedure of FIG. 2 goes to step 108, discussed below. If, however, the searching computer determines that the un-located computer is in the data processing center 10, then the procedure moves on to step 110, where a message is sent to the un-located computer to generate some signal or response that may be used to identify its physical location. For example, as mentioned above, the un-located computer may be asked to produce an audible signal by beeping a speaker that is part of the computer system. Other types of signals may also be used, however, such as a blinking light.

After step 110, the searching system waits for a period of time, referred to as timeout, for a response, as represented by steps 112 and 114. Preferably, the length of this time-out is determined before the procedure begins a particular cycle. Also, preferably the length of the time-out is adjustable, and for example, may be adjusted by the system user. If a response is received within the time-out period, then preferably the actual physical location of that computer is identified and entered in a database, as represented by step 116. After this is done, the procedure goes to step 118, and the searching system determines, in any suitable manner, whether any more computer systems are to be located. If more systems are to be located, the procedure returns to step 102; however, if no more systems are to be located, the procedure is exited at step 120.

If at step 106, the searching computer determines that the un-located system is not in the center, or if at step 114, a response is not received within the time-out, then the procedure goes to step 108. At this step, the user is notified that the un-located system is not active. After step 108, the procedure moves on to step 118 and proceeds from there as discussed above.

Figure 3:
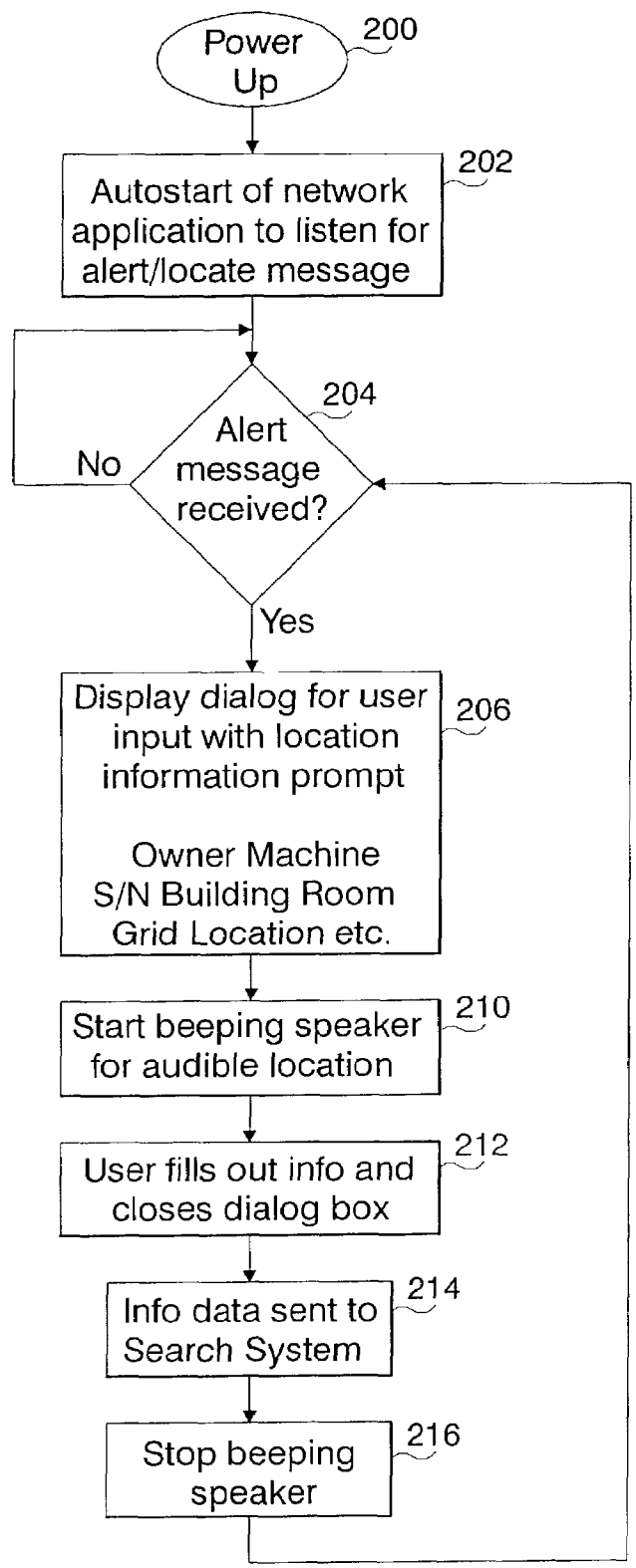
FIG. 3 is a flow chart showing a procedure that may be used by the computers of the data processing center to monitor for and to respond to the search procedure of FIG. 2.

FIG. 3 is a flow chart of a preferred procedure that may be used by each of the computers 12 of center 10 to monitor for and to respond to the searching procedure of FIG. 2. At step 200, the computer is started, and step 202 represents the start of an application to listen for the alert/locate message sent at step 110 of FIG. 2. Any suitable routine may be used to listen for this message. The computer continuously listens for this message, as represented by step 204, and when a message is received, the procedure goes to steps 206 and 210.

At step 206, the computer displays a dialog box prompting the user of that computer to input information. This information, for example, may identify the specific location of the computer, such as the building and room in which the computer is located. Other information may also be prompted such as the computer's owner and serial no. At step 210, the procedure causes the computer to generate a signal or response that may be used to locate physically the computer. For example, a speaker may start beeping, although other signals can also be used.

At step 212 of the procedure, the user provides the information requested in the dialog box, and closes that box; and at step 214, the provided information is sent to the searching computer. After a given period of time, as represented by step 216, the computer stops producing the signal or message started at step 210; and from step 216, the computer returns to step 204, and the procedure again monitors for an alert/locate message.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of locating an un-located asset in a computer center including a plurality of assets connected together by a network, the method comprising the steps of:
   a host asset of the computer center, obtaining an address for the un-located asset and checking to determine whether the un-located asset is present in the computer center, including the steps of:
   the host asset sending a message to the un-located asset for the un-located asset to confirm that the un-located asset is in the computer center,
   the un-located asset, in response to receiving said message, sending a reply message to the host asset,
   the host asset determining, on the basis of said reply message, whether the un-located asset is or is not in the computer center;
   if the un-located asset is in the computer center, then said host asset sending a locate command to the un-located asset, through the computer center network, for the un-located asset to produce a locate signal for physically locating the un-located asset;
   in response to receiving said locate command, the un-located asset producing a signal to identify the physical location of the un-located asset; and
   if the un-located asset is not in the computer center, then the host asset notifying a system user that the un-located asset is not active.

2. The method according to claim 1, further comprising the steps of:
   in response to receipt of said locate command, the un-located asset displaying a prompt requesting information from a user of the un-located asset;
   the user providing the requested information; and
   the un-located asset sending the requested information, through the computer center, to the host asset.

3. The method according to claim 2, wherein:
   the step of sending the locate command includes that the host asset waits for a period of time after sending the locate command to receive the locate signal from the un-located asset; and if said locate signal is not received within said period of time, notifying the system user that the un-located asset is not confirmed to be present and active in the computer center; and wherein said period of time is adjustable by the system user.

4. Apparatus for using a first asset in a computer center to locate a second asset in the computer center, wherein the computer center includes at least a plurality of host assets connected together by a network, the apparatus comprising
   one or more processing units, located in the first asset, and configured for:
   obtaining an address of the second asset and for checking to verify whether the second asset is in the computer center by sending a message to the un-located asset for the un-located asset to confirm that the un-located asset is in the computer center, wherein: the un-located asset, in response to receiving said message, sends a reply message to the host asset, and the host asset determines, on the basis of said reply message, whether the un-located asset is or is not in the computer center;

operating if said second asset is in the computer center, for sending a locate command, through the computer center network, for the second asset to produce a locate signal for physically locating the second asset, and wherein, in response to receiving said locate command, the un-located asset produces a signal to identify the physical location of the un-located asset; and operating if said second asset is not in the computer center, to notify a system user that the second asset is not active.

5. Apparatus according to claim 4, further comprising one or more processing units, located on the second asset, and configured for:

displaying, in response to receipt of said locate command, a prompt requesting information from a user of the second asset;

receiving the requested information from the user; and sending the requested information, through the computer center network, to the first asset.

6. The apparatus according to claim 5, wherein:

the second asset waits for a period of time after sending the locate command to receive the locate signal from the un-located asset; and if said locate signal is not received within said period of time, the second asset notifies the system user that the un-located asset is not active, and wherein said period of time is adjustable by the system user.

7. A program storage device readable by machine, tangibly embodying a program of instructions executable by the machine to perform method steps for locating an un-located asset in a computer center including a plurality of assets connected together by a network, said method steps comprising:

using a host asset of the computer center to obtain an address for the un-located asset and to check to determine whether the un-located asset is present and active by sending a message to the un-located asset for the un-located asset to confirm that the un-located asset is in the computer center, wherein:

the un-located asset, in response to receiving said message, sends a reply message to the host asset, the host asset determines, on the basis of said reply message, whether the un-located asset is or is not in the computer center;

if said un-located asset is in the computer center, then said host asset sending a locate command from the host asset to the un-located asset, through the computer center network, for the un-located asset to produce a locate signal for physically locating the un-located asset, and wherein, in response to receiving said locate command, the un-located asset produces a signal to identify the physical location of the un-located asset; and if the un-located asset is not in the computer center, then the host asset notifying a system user that the un-located asset is not active.

8. The program storage device according to claim 7, wherein said method further comprises the steps of:

in response to receipt of said locate command, the un-located asset displaying a prompt requesting information from a user of the un-located asset; and in response to the prompt, the user providing the requested information, and the un-located asset sending the requested information to the host asset through the computer center network.

9. The program storage device according to claim 8, wherein:

the step of sending the locate command includes tat the host asset waits for a period of time after sending the locate command to receive the locate signal from the un-located asset; and if said locate signal is not received within said period of time, notifying the system user that the un-located asset is not confirmed to be present and active in the computer center; and wherein said period of time is adjustable by the system user.

\* \* \* \* \*